United States Patent
Kapoor et al.

(10) Patent No.: US 8,315,986 B1
(45) Date of Patent: Nov. 20, 2012

(54) RESTORE OPTIMIZATION

(75) Inventors: Aditya Kapoor, Bellevue, WA (US);
Christopher Hercules Claudatos, San Jose, CA (US); William Dale Andruss, Minneapolis, MN (US)

(73) Assignee: EMC Corporation, Hopkinton, MA (US)

( * ) Notice: Subject to any disclaimer, the term of this patent is extended or adjusted under 35 U.S.C. 154(b) by 397 days.

(21) Appl. No.: 12/004,735

(22) Filed: Dec. 24, 2007

(51) Int. Cl.
*G06F 17/30* (2006.01)

(52) U.S. Cl. ........................................ 707/679

(58) Field of Classification Search .......... 707/640–673, 707/999.204, 679–686
See application file for complete search history.

(56) References Cited

U.S. PATENT DOCUMENTS

| | | | |
|---|---|---|---|
| 6,865,655 B1 | 3/2005 | Andersen | |
| 7,698,318 B2 | 4/2010 | Fries et al. | |
| 2003/0046313 A1* | 3/2003 | Leung et al. | 707/204 |
| 2003/0154220 A1* | 8/2003 | Cannon | 707/204 |
| 2003/0191916 A1 | 10/2003 | McBrearty et al. | |
| 2006/0271601 A1* | 11/2006 | Fatula et al. | 707/201 |
| 2007/0136200 A1 | 6/2007 | Frank et al. | |
| 2007/0204003 A1 | 8/2007 | Abramson | |
| 2008/0172445 A1* | 7/2008 | Zaidelson et al. | 709/201 |
| 2009/0276456 A1* | 11/2009 | Neubacher et al. | 707/103 R |

OTHER PUBLICATIONS

N. Liogkas, R. Nelson, E. Kohler and L. Zhang, "Exploiting BitTorrent for Fun (But Not Profit)" Proc the 5th International Workshop on Peer-to-Peer Systems (IPTPS), Santa Barbara, CA USA, Feb. 2006.

\* cited by examiner

*Primary Examiner* — Thu-Nguyet Le
(74) *Attorney, Agent, or Firm* — Theodore A. Chen; Krishnendu Gupta

(57) ABSTRACT

A method, article of manufacture, and apparatus for protecting data, comprising receiving information about objects stored on a plurality of hosts, determining whether an object needs to be backed up, and if the object needs to be backed up, requesting each host having the object to provide a portion of the object to a target. Information about the objects and backup may be stored in an index. A requesting host may request an object to be restored to a target. It is determined whether the object is available at the backup and at other hosts, and the backup and hosts having the object may be requested to provide portions of the object to the target, which may be the requesting host. The index may be used to determine availability of the object at the backup and other hosts.

16 Claims, 3 Drawing Sheets

RESTORE OPTIMIZATION

FIELD OF THE INVENTION

This invention relates generally to data protection, and more particularly to systems and methods for performing backup, archive, or restore operations on data.

BACKGROUND OF THE INVENTION

This invention relates to systems and methods for performing backup, archive, or restore operations on data. Typically, backups are initiated automatically according to a schedule, and make copies of data found on various systems. Often, data that exists on one system may be found on other systems, and backups may include multiple copies of the same data. De-duplication systems may be used, but typically will make at least one backup copy.

Unnecessary creation of backup copies results in increased space requirements, network traffic, processing load, and larger backup windows. When a backup is performed, there is significant performance impact on a host system backing up its data, although de-duplication methods mitigate the performance impact for other hosts having copies of data that has already been backed up by the first host.

Further, when restoring data from a backup, the restore may be slowed by performance limitations of the system providing the restored data. In some cases, such as with satellite offices, the backup storage may be remotely located from the host requesting the restore, and bandwidth may be limited. Restoring several hundred gigabytes over a low-bandwidth connection could take weeks, even if 100% of the bandwidth were dedicated to the restore.

Although existing various methods provide reasonable means of protecting data, with the explosion in the amount of data being generated, the resources needed for backup, archive, and restore are rising dramatically. There is a need, therefore, for an improved method, article of manufacture, and apparatus for performing backup, archive, or restore operations on data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
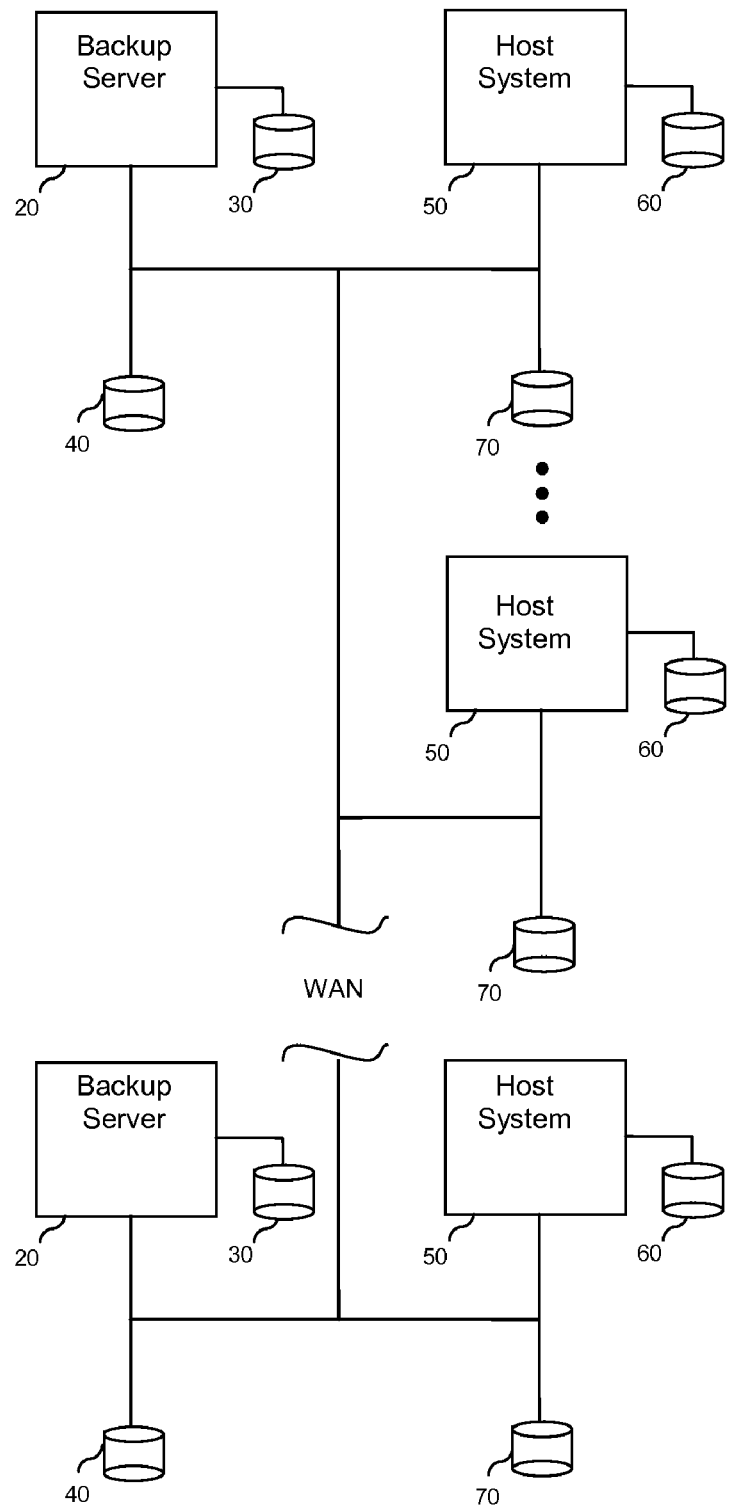
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a computer system on which a backup program executes, but it should be understood that the principles of the invention are not limited to this particular configuration. Rather, they may be applied to any system in which data is transmitted across a connection to a remote device, and the system may comprise one or more devices. The system may comprise a personal computer, personal digital assistant (PDA), mobile phone, or other electronic device. Although the methods herein are described in terms of their application to performing backup, archive, or restore operations on data, one skilled in the art will recognize that they are equally applicable to other cases for which it is desirable to transfer data across a connection, including but not limited to replication and transmission. For example, the principles disclosed herein may be applied to replication, to rapidly create a functionally useful replication set at another location. Backup of information and data is not limited to disk-image or file-based backups, and may be of any type or combination that results in a sufficient copy of the appropriate disk and data elements. The terms "files" and "data" are used herein to refer to objects, but it should be understood that the disclosure is not restricted to files. The disclosure applies equally to block level backup, image level backup, or any combination or variation of these, and to any data objects used in a backup, restore, replication, archive, or transmission process or part of a backup, restore, replication, archive, or transmission process. Disclosed herein are a method and system to back up and restore data efficiently. The principles disclosed herein provide for a more efficient backup, archiving, and replication process that monitors files and performs copying operations when appropriate.

FIG. 1 illustrates a configuration in which a backup and restore system 10 comprising a backup program could be used to back up data in the form of files or blocks. Backup server 20 communicates with host system 50 over a network (e.g., a local area network, wide area network, etc.). Host system 50 may have a backup client executing on it, and may have storage systems 60 and/or 70 on which its data is stored. Host system 50 may be associated with other storage systems (not shown). Host system 50 may send its backups to backup storage system 40 or storage system 30 attached to backup server 20. When restore operations are performed, backup data from backup storage system 30 or may be restored to storage system 60 or 70 for use by the host system 50. The various functions described herein may be performed by a program executing on backup server 20, one of host systems 50, or another system (not shown). The program may be used to capture information about the files or data in the system 10. It will be understood that the program may execute on any of the systems shown or on other systems, and that more than one agent may be used. Various configurations are possible, and the principles disclosed herein are not limited to the embodiment disclosed. For example, a host system 50 and storage system 60 or 70 may function in place of a backup server 20 and backup storage 30 or 40. In some embodiments, the various storage systems 30, 40, 60, and 70 may be virtual storage devices, and could be physically implemented as partitions or directories on other storage systems. The various host systems 50 could be implemented as virtual machines on a server.

In some embodiments, backup server 20 may receive information about files on the host systems 50, through various means such as polling, periodically receiving updates from host systems 50, or immediately being notified of files as they appear on host systems 50. In some embodiments, a system may monitor its files continuously, and report changed files to backup server 20 periodically. Files declared to backup server 20 by a host system 50 may be a subset of the files present on host system 50, such as files desired to be backed up by backup server 20. Various methods may be used to uniquely identify a file and its versions, such as hash algorithms, using filenames, timestamps, file size, file data, etc. Unique identifiers may be associated with each file and version, and compared to determine whether a file is present on a system. Various methods of tracking the files may be used. An index of files (including versions), and associated unique identifiers may be used to track files and their locations. A list of files and associated unique identifiers may be kept for each host system 50.

The backup, archiving, and replication of files may be determined according to policy. Using the information about files on host systems 50, backup server 20 may identify a file that should be backed up to backup storage 30 or 40. In some embodiments, backup copies of a file on a host system 50 may be made only when there is no other copy of the file on any other host system 50 or on backup storage 30 or 40. If there is no other copy of the file, the file may be backed up to backup storage 30 or 40. If another copy of the file exists on another host system 50, the backup server 20 may simply record the existence of the file on that system. Where multiple copies exist and it is determined that the file should be backed up to the backup storage 30 or 40, the backup may be performed by a single host system 50 or by multiple host systems 50 as described herein.

In some embodiments, geographic location of the file may be taken into account. For example, if multiple copies of a file exist only within a local group of host systems 50, it may be desired to create a copy of the file in a different location, such as at a remote office. This configuration may be used in the case of satellite offices, where it may be desirable to create a copy of the file offsite at a remote system. Backup server 20 may request replication of a file to a backup storage 30 or 40 in the other location; for example, from host system(s) 50 to a backup storage 30 or 40 on the other side of the WAN connection as shown in FIG. 1. Backups may be performed immediately upon discovering a file, or performed periodically. In some embodiments, it may be desired to archive the file, and archival may proceed similarly to backup as described herein. It will be appreciated that various policies and configurations are possible without departing from the spirit of the invention. For example, the methods described herein may be applied to objects or blocks.

Each host system 50 being backed up may send its data to backup storage 30 or backup storage 40 as directed by backup server 20. If a file is present on more than one host system 50 (such as on storage 60 or storage 70), multiple copies of the file may thus be sent to backup storage 30 or 40. De-duplication may be performed, in which only one copy of the file is sent to backup storage 30 or 40. After a first host system 50 sends its copy of the file to the backup storage 30 or 40, other host systems 50 having the same file will not be requested to send their copies of the file to the backup storage 30 or 40. The first host system 50 thus bears the load of backing up the file, and a duplicate copy of the file will be made at backup storage 30 or 40, occupying some space on backup storage 30 or 40 as well as consuming network resources.

In some embodiments, if the file is determined to be present on more than one host system 50, backup server 20 may request one or more of the host systems 50 to provide at least a portion of the file to backup storage 30 or 40. The file may be divided into several portions ("chunks"), and each host system 50 requested to provide a different chunk of the file to backup storage 30 or 40. Some or all of the host systems 50 having the file may be requested to provide portions, and the amount requested from each host system 50 may vary according to other factors such as system capability, system load, network utilization, etc. In some embodiments, a deterministic "chunking" algorithm may be used, such that a given file will always be chunked in the same way. The chunking may be performed by a host system 50, upon receiving a request from backup server 20 to perform a backup. Backup server 20 may indicate to the host systems 50 possessing the file to provide chunks to the backup storage 30 or 40. Chunking may be performed by backup system 20, which may communicate to the host systems 50 what portions of the file they are requested to transmit. In some embodiments, backup system 20 may indicate to the host systems 50 what portions of the file it has, and request them to transmit other portions of the file. In this manner, the load of backing up the file may be shared among several host systems 50, thereby reducing the impact on any individual host system 50. After the backup storage 30 or 40 has received the chunks, it may use them to reassemble the file.

Backups may be restored as needed, to the original system or device, or another system or device. Typical backup systems may restore data from the backup storage 30 or 40 to a host system 50. In some cases, the restore may take place over a WAN connection where bandwidth is limited, and if many gigabytes of data are being restored, a full restore may take hours if not days. The backup storage 30 or 40 may become a bottleneck. It may be burdened with multiple restore requests, or there may be delay while waiting for a tape to be loaded and mounted. Thus, for a variety of reasons, it may be desirable to restore the data from sources other than backup storage 30 or 40.

In some embodiments, duplicate copies of the file(s) being restored may be used in restoring the file(s) to a host system 50 (or its storage 60 or 70). Backup server 20 may be configured to monitor files on the host systems 50, and thus have information about where copies of the files may be found, whether on host systems 50 (in storage 60 or 70) or in backup storage 30 or 40. The monitoring may occur during backup/ data protection, prior to restore, and the information may be saved in a hash index. The restore process may use this hash index to locate files. In some embodiments, when a restore of a file is requested, backup server 20 may identify sources of the file, and direct the host systems 50 having the file to provide chunks of the file to the requesting host system 50 needing the restore. Backup server 20 may additionally initiate transfer of chunks from backup storage 30 or 40 to the requesting host system 50. In some embodiments, backup server 20 may provide the requesting host system 50 with information about host systems 50 possessing the requested file, and the requesting host system 50 may communicate directly with host systems 50 to request chunks.

Backup server 20 may initiate transfer of chunks from the backup storage 30 or 40 to the requesting host system 50, and other hosts may be requested to provide chunks as well. The backup storage 30 or 40 may provide most of the chunks, with the other hosts serving to accelerate the restore by providing chunks as well, or may simply be one of several sources providing chunks, or not provide any (such as if the file has not been backed up to the backup storage). Each source may thus provide a different portion of the file to the requesting host system 50, which may then assemble the portions to reconstitute the file. In this manner, the load of restoring the file may be spread among several systems, and the file restore may be completed much faster. Chunking may be performed by backup system 20 or by host systems 50, using a chunking algorithm that may be deterministic. In some embodiments, the chunks may be provided to a target other than the requesting host system 50, such as a storage device associated with the requesting host.

Figure 2:
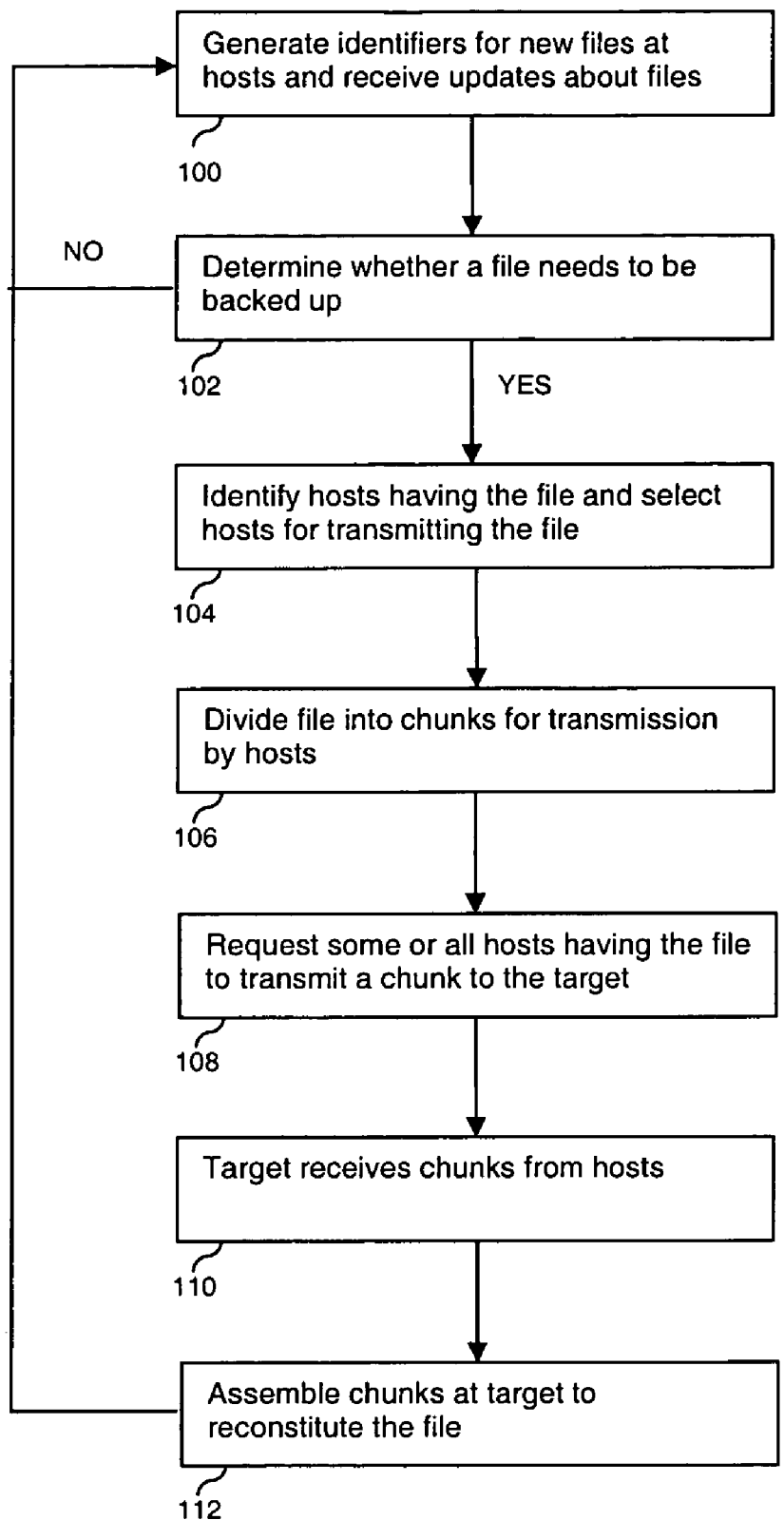
FIG. 2 is a flowchart illustrating a process for backing up data in some embodiments of the invention.

A process flow illustrating an embodiment is shown in FIG. 2. In step 100, unique identifiers are generated for new files and updates about the files are received. When a new file is identified, it is determined whether the file needs to be backed up, in step 102. If not, the process returns to step 100 and continues to monitor files. If backup is needed, hosts having the file are identified, and all or some of those hosts may be selected to provide the file, step 104. The file is divided into chunks for transmission by the hosts, step 106, and the hosts are each requested to transmit a chunk to the target, step 108. In step 110, the target receives the chunks from the hosts, and assembles them to reconstitute the file, step 112. This process may be performed serially for each file needing backup, or it may be performed for batches of files.

An example will be provided to illustrate the principles disclosed herein.

1. All backup clients declare to the backup server which files they need backed up, using an algorithm to generate unique identifiers for the files. The algorithm may be designed such that all files with the same data, name, and size generate the same identifier regardless of location.

2. The backup server receives new unique IDs from the backup clients and checks to determine if the associated files need to be backed up. This determination may be made based on whether a copy of the file is available locally or at another location. "Local" may refer to a local area network or some configurations in which high bandwidth is readily available.

3. Clients may always run in discovery mode, in which they send the file information (including unique ID) to the backup server as soon as they find a new file. They may also provide the updates periodically.

4. An email message arrives, containing an attachment, and is addressed to many people in the organization. The attachment is saved by the users in various directories on various systems. Clients running on the various systems discover this new file, generate the same unique ID, and report it to the backup server.

5. The backup server sees multiple new files with the same ID, and determines whether backup is needed. In one case, backup policy may specify that if copies of the file are available locally, no backup needs to be made, and thus the backup server takes no action after recording the information about the new files. The backup policy may specify that there needs to be a copy of the file stored in a local backup, or that a copy of the file must be stored offsite. In this case, the backup server determines that a backup needs to be made to the target (whether local or offsite).

6. The file is broken into chunks. The backup server requests the chunks from the clients that have the file. The backup server may either request specific chunks, or identify chunks it has so that other chunks are sent.

7. The chunks are received at the target and assembled to produce the file.

In this manner, none of the clients are bogged down by the backup, and the backup server backs up only once.

Figure 3:
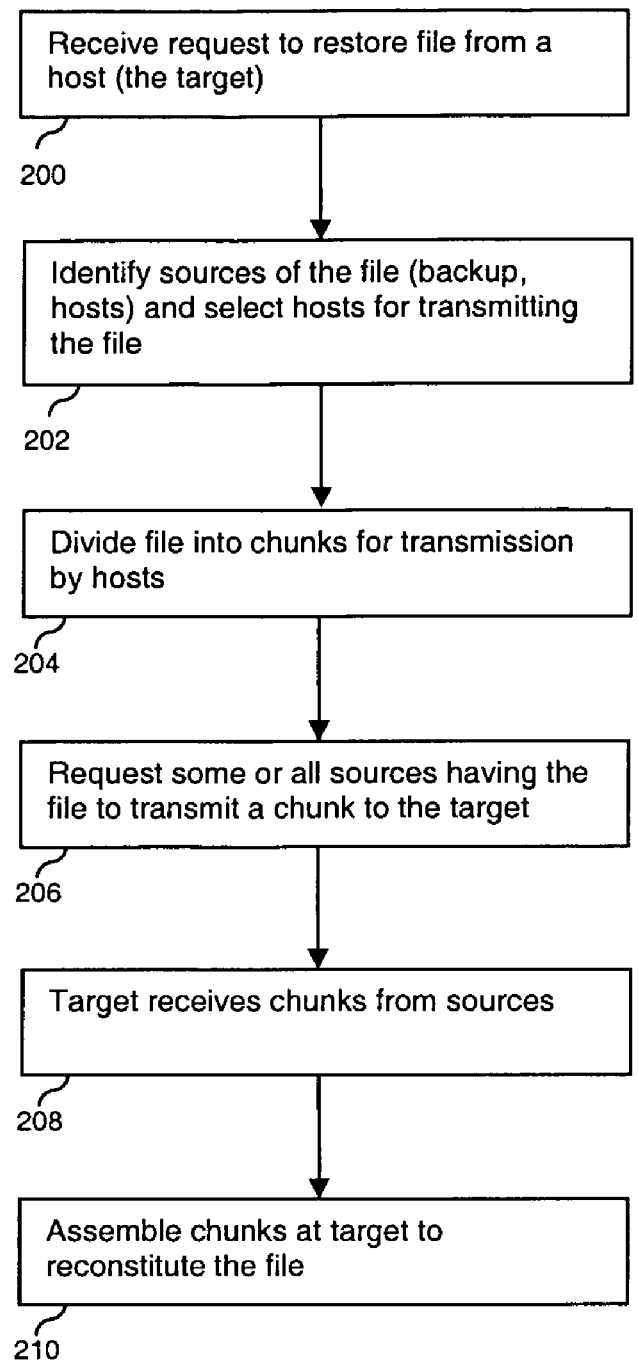
FIG. 3 is a flowchart illustrating a process for restoring data in some embodiments of the invention.

FIG. 3 illustrates a process flow in an embodiment. In step 200, a request to restore a file is received from a host system 50. Sources of the file are identified, step 202, and may include the backup storage 30 or 40 as well as host systems 50. The file is divided into chunks, step 204—or this may have been done previously, and information about the chunks recorded. The chunking may be performed by any system or all systems having the file. In step 206, some or all of the sources are requested to provide chunks of the file to the host system 50 (or a target specified by the host, such as storage 60 or 70). The target receives the chunks from the sources of the file, step 208, and assembles them to reconstitute the file in step 210. This process may be performed serially for each file needing restore, or it may be performed for batches of files.

For example, a client may contact the backup server to request restore of a file. The backup server may use the unique ID of the file to determine which other clients have a copy of the file, and whether the file is available from the backup storage. The backup server may initiate transfer of chunks of the file from the backup storage and from other clients having a copy of the file. In some embodiments, the backup server may provide the requesting client with information about the clients having a copy of the file, and the requesting client may contact the other clients directly to request chunks of the file.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for restoring objects in a system including hosts and a backup, comprising:
   receiving a request from a requesting host to restore an object;
   using an algorithm to generate a unique identifier, wherein the algorithm is designed such that all objects with identical data will generate the same unique identifier regardless of location;
   associating the unique identifier with the object, wherein the unique identifier also indicates a version of the object;
   determining, by the backup using the associated unique identifier, whether the backup has the object, and which hosts have the object, wherein the determination is based on a continuously updated index; and
   based on the determination, initiating transfer to a target portions of the object from the backup and hosts having the object, wherein transfer to a target portions of the object from the backup and hosts having the object includes transfer a first portion of the object from the backup and a second portion from hosts having the object, and wherein the backup includes a backup storage system.

2. The method as recited in claim 1, wherein the target includes the requesting host.

3. The method as recited in claim 1, wherein the target includes a destination other than the requesting host.

4. The method as recited in claim 1, wherein each host having the object provides a different portion of the object to the requesting host.

5. The method as recited in claim 4, further comprising using a deterministic algorithm at each host to divide the object into portions.

6. The method as recited in claim 5, further comprising combining the portions at the target to reconstitute the object.

7. The method as recited in claim 1, further comprising using the unique identifier of an object to determine whether the object is present at a host.

8. The method as recited in claim 7, wherein determining whether an object needs to be backed up includes using the unique identifier of the object to determine whether the object is present at the target.

9. The method as recited in claim 1, wherein determining availability includes determining whether the other host is local to the target.

10. The method as recited in claim 9, wherein determining whether the other host is local includes determining geographic location.

11. The method as recited in claim 1, further comprising receiving information about objects stored on a plurality of hosts, and wherein determining availability of the object at other hosts and the backup includes using the information to determine whether the object is present at a host.

12. The method as recited in claim 11, wherein receiving information about the objects includes receiving the information concurrently with discovery of new objects on the hosts.

13. The method as recited in claim 1, further comprising:
    receiving information about objects stored on a plurality of hosts;
    determining whether an object needs to be backed up; and
    if the object needs to be backed up, requesting each host having the object to provide a portion of the object to a target.

14. The method as recited in claim 13, wherein determining availability of the object at other hosts and the backup includes using the information to determine whether the object is present at a host.

15. A system for restoring objects, comprising a processor configured to:
    receive a request from a requesting host to restore an object;
    using an algorithm to generate a unique identifier, wherein the algorithm is designed such that all objects with identical data will generate the same unique identifier regardless of location;
    associating the unique identifier with the object, wherein the unique identifier also indicates a version of the object;
    determine, by a backup using the associated unique identifier, whether the backup has the object, and which hosts have the object, wherein the determination is based on a continuously updated index; and
    based on the determination, initiate transfer to a target portions of the object from the backup and hosts having the object, wherein transfer to a target portions of the object from the backup and hosts having the object includes transfer a first portion of the object from the backup and a second portion from hosts having the object, and wherein the backup includes a backup storage system.

16. A computer program product for protecting objects, comprising a computer readable medium having program instructions embodied therein for:
    receiving a request from a requesting host to restore an object;
    using an algorithm to generate a unique identifier, wherein the algorithm is designed such that all objects with identical data will generate the same unique identifier regardless of location;
    associating the unique identifier with the object, wherein the unique identifier also indicates a version of the object;
    determining, by a backup using the associated unique identifier, whether the backup has the object, and which hosts have the object, wherein the determination is based on a continuously updated index; and
    based on the determination, initiating transfer to a target portions of the object from the backup and hosts having the object, wherein transfer to a target portions of the object from the backup and hosts having the object includes transfer a first portion of the object from the backup and a second portion from hosts having the object, and wherein the backup includes a backup storage system.

* * * * *